United States Patent [19]

Kasai et al.

[11] Patent Number: 4,716,028

[45] Date of Patent: Dec. 29, 1987

[54] PROCESS FOR PREPARATION OF HIGH-TYPE SILICON NITRIDE POWDER

[75] Inventors: Kiyoshi Kasai, Atsugi; Takaaki Tsukidate, Hino; Toshihiko Arakawa, Machida, all of Japan

[73] Assignee: Toyo Soda Manufacturing Co., Ltd., Shinnanyo, Japan

[21] Appl. No.: 829,171

[22] Filed: Feb. 14, 1986

[30] Foreign Application Priority Data

Feb. 18, 1985 [JP] Japan .................. 60-28467

[51] Int. Cl.⁴ .................. C01B 21/063; C01B 33/06
[52] U.S. Cl. .................. 423/344; 423/406; 501/97
[58] Field of Search .................. 423/344, 406; 501/97

[56] References Cited

U.S. PATENT DOCUMENTS 4,341,874  7/1982  Nishida et al. .................. 501/97

FOREIGN PATENT DOCUMENTS 3235304  4/1983  Fed. Rep. of Germany ...... 423/344
0021507  2/1984  Japan .................. 423/344
1122167  6/1986  Japan .................. 501/97

*Primary Examiner*—John Doll
*Assistant Examiner*—Lori S. Freeman
*Attorney, Agent, or Firm*—Cushman, Darby & Cushman

[57] ABSTRACT

A high α-type silicon nitride powder is prepared by thermally decomposing a mixture of a crystalline silicon nitride powder having an oxygen content of at least 1.0% by weight and a nitrogen-containing silane compound.

5 Claims, No Drawings

PROCESS FOR PREPARATION OF HIGH-TYPE SILICON NITRIDE POWDER

BACKGROUND OF THE INVENTION

1. Field of the Invention

The present invention relates to a process for the preparation of a high α-type silicon nitride powder suitable for the production of a sintered silicon nitride body valuable as a high-temperature structural material.

2. Description of the Related Art

According to the thermal decomposition of silicon imide, α-type silicon nitride having a high purity can easily be obtained. However, the grain of the product is mainly of a needle or columnar shape, and when the product is used as a sintering material, the resulting sintered, molded body has a very low density and a sintered body having a high density cannot be obtained.

As means for overcoming this defect, we previously proposed a process for the preparation of a silicon nitride powder by the thermal decomposition of a nitrogen-containing silane compound, wherein the temperature-elevating rate is controlled to at least 15° C./min in the temperature range of from 1,350° to 1,550° C. (Japanese Unexamined Patent Publication No. 58-55,315) and another process for the preparation of a silicon nitride powder in which a nitrogen containing silane compound having a powder bulk specific gravity of at least 0.1 g/cm$^3$ as silicon is heated (Japanese Unexamined Patent Publication No. 58-55,316). Powders obtained according to these processes have a high purity and a very fine size, and show an excellent sintering property and excellent high-temperature characteristics. However, since the value of the fracture toughness is low, the strength of these powders at normal temperature is almost the same as that of the conventional silicon nitride powder.

SUMMARY OF THE INVENTION

It is therefore an object of the present invention to provide a process for preparing a silicon nitride powder having a high purity in which the content of the α-phase promoting increase of the value of the fracture toughness is greatly increased and which is composed of fine particulate crystals.

More specifically, in accordance with the present invention, there is provided a process for preparing crystalline silicone nitride by thermal decomposition of a nitrogen-containing silane compound, which comprises thermally decomposing a mixture of a crystalline silicon nitride powder having an oxygen content of at least 1.0% by weight and a nitrogen-containing silane compound to form a high α-type silicon nitride powder.

DESCRIPTION OF THE PREFERRED EMBODIMENTS

As the nitrogen-containing silane compound used in the present invention, there can be mentioned silicon diimide obtained by washing with liquid NH$_3$ mixture of silicon diimide Si(NH)$_2$ and ammonium chloride, which mixture is a product formed by reaction between a silicon halide and ammonia, and a decomposition product Si$_2$N$_3$H obtained by heating silicon diimide and ammonium chloride in nitrogen or ammonia. It is preferred that a nitrogen-containing silane compound in which the halogen content in the powder is lower than 1% by weight be used.

The present invention is characterized in that a crystalline silicon nitride powder containing oxygen at a content of at least 1.0% by weight is used. When a crystalline silicon nitride powder having an oxygen content lower than 1.0% by weight is used, only silicon nitride having a low α-phase content is obtained. Even if the oxygen content is excessively high, the α-phase content is not proportionally increased but the impurity content in obtained silicon nitride is excessively increased. Accordingly, it is preferred that the oxygen content in the starting silicon nitride powder be up to 3% by weight.

This oxygen is present in the state substituted for a part of the nitrogen atom and forms a glass phase.

According to the present invention, a mixture of the crystalline silicon nitride powder having an oxygen content of at least 1.0% by weight and the nitrogen-containing silane compound are preferably formed into a powder or molded body having a powder bulk density of at least 0.1 g/cm$^3$ as silicon by compression molding or granulating and is used in the form of this powder or molded body. This is because in the case of a powder or molded body having a powder bulk density lower than 0.1 g/cm$^3$, a needle crystal or columnar crystal is readily formed.

It is preferred that the mixing ratio between the crystalline silicon nitride and the nitrogen-containing silane compound be such that the content of the crystalline silicon nitride powder in the mixture is 0.1 to 15% by weight. If the content of the crystalline silicon nitride powder is below this range, the effect is insufficient. In contrast, if the content is too high, no corresponding increase of the effect is attained but the oxygen content in the product becomes too high.

According to the present invention, a mixture of the starting crystalline silicon nitride and nitrogen-containing silane compound are heated at 1,400° to 1,700° C., preferably 1,500° to 1,600° C., in an atmosphere of nitrogen or the like to effect the thermal decomposition. If the heating temperature is lower than 1,400° C., the thermal decomposition of the silane-containing compound is insufficient and amorphous silicon nitride is inevitably formed. If the heating temperature exceeds 1,700° C., growth of crystal grains of silicon nitride and increased of the β-phase content readily occur.

In accordance with a preferred embodiment of the present invention, in thermally decomposing and crystallizing the mixture of the crystalline silicon nitride powder and the nitrogen-containing silane compound, the temperature-elevating rate is controlled to at least 15° C./min in the temperature range of 1,350° to 1,550° C. If this temperature-elevating rate is lower than 15° C./min, crystal nuclei which begin to take shape at about 1,350° C. cause the growth of grains and the proportion of formed β-type silicon nitride, which is of a stable phase, is readily increased.

An atmosphere preferable for performing the thermal decomposition in the present invention, especially in the temperature range of 1,350° to 1,700° C., is a nitrogen atmosphere. Other atmospheres may be adopted. However, decomposition of a part of the silicon nitride to silicon is caused in an inert gas atmosphere or in vacuum, and in a hydrogen or halogen gas atmosphere, formation of silicon nitride of needle crystals is promoted. Accordingly, use of these gases is not preferred.

The reason why a silicon nitride powder having a high α-phase content is obtained by thermally decomposing a nitrogen-containing silane compound in the presence of the crystalline silicon nitride powder having an oxygen content of at least 1.0% by weight has not been completely elucidated. However, it is considered that, at the heating step, silicon monoxide is generated from the added silicon nitride powder and a partial pressure of silicon monoxide effective for formation of α-phase silicon nitride can be maintained.

As is apparent from the foregoing description, by thermally decomposing a mixture of a crystalline silicon nitride powder having an oxygen content of at least 1.0% by weight and a nitrogen-containing silane compound, a fine powder having a high α-phase content can be obtained. Accordingly, if a sintered silicon nitride body is prepared by using this fine powder as the starting material, the obtained sintered body is chemically and physically stable. Therefore, the fine powder is very valuable as the starting material for a sintered silicon nitride body for a high temperature gas turbine, for which high strength and reliability not attained by the conventionals sintered body are required.

A sintered body obtained from silicon nitride having a low α-phase content, as obtained in the comparative examples given hereinafter, is poor in not only fracture toughness but also the strength at room temperature. A high-strength sintered body cannot be obtained from such silicon nitride.

The present invention will now be described in detail with reference to the following examples that by no means limit the scope of the invention.

In the examples and comparative examples given hereinafter, the α-phase content of the silicon nitride powder was determined by the X-ray diffractometry described in Ceramic Bulletin, 56, 777–780 (1977), and the average particle size was measured by using a scanning electron mixeoscope.

EXAMPLE 1 THROUGH 3 AND COMPARATIVE EXAMPLE 1

Silicon diimide was calcined at 1,000° C. for 2 hours in an ammonia atmosphere to obtain a white amorphous powder. From the elementary analysis values of Si, N and H, it was found that the composition of the obtained powder was very close to $Si_2N_3H$, and that the chlorine content was 0.5% by weight and the oxygen content was 1.5% by weight.

The powder was mixed with a crystalline silicon nitride powder having an oxygen content of 1.5% by weight, an α-phase content of 86% and an average particle size of 0.3 μm in a proportion shown in Table 1, and the mixture was stirred in a vibrating ball mill formed of nylon for 30 minutes. The obtained powder was compression-molded under a molding pressure of 200 kg/cm² in a mold press having a diameter of 25 mm to obtain a molded body having a bulk density of 0.18 g/cm³ as Si. The molded body was inserted in a tubular furnace maintained at 1,550° C. and was maintained in this state for 0.5 hour to obtain a silicon nitride powder. The nitrogen content, α-phase content, and average particle size were determined. The obtained results are shown in Table 1.

The obtained powder was mixed with 5% by weight of $Y_2O_3$ and 5% by weight of $Al_2O_3$ in a silicon nitride ball mill and the mixture was molded under a molding pressure of 1.5 t/cm² by a cold isostatic press. The molded body was sintered under atmospheric pressure at 1,750° C. for 2 hours. The sintered body was ground by a diamond #400 abrasive, and the density, flexural strength, and fracture toughness of the sintered body were measured. The obtained results are shown in Table 1.

Note, the flexural strength was measured by the three-point bending test while adjusting the distance between fulcra to 30 mm, and a mean value obtained with respect to 10 specimens is shown. The fracture toughness was determined according to the microindentation method.

TABLE 1

|  | Amount of added crystalline silicon nitride powder (wt. %) | Nitrogen content (wt. %) | α-Phase content (wt. %) | Average particle size (μm) | Density of sintered body (g/cm³) | Fracture toughness (MN/m^{3/2}) | Room temperature strength (kg/mm²) |
| --- | --- | --- | --- | --- | --- | --- | --- |
| Example 1 | 0.5 | 38.8 | 94 | 0.3 | 3.23 | 6.4 | 90 |
| Example 2 | 2 | 38.9 | 94 | 0.3 | 3.24 | 6.5 | 100 |
| Example 3 | 10 | 38.7 | 93 | 0.4 | 3.23 | 6.5 | 91 |
| Comparative Example 1 | 0 | 38.8 | 86 | 0.3 | 3.23 | 5.5 | 75 |

EXAMPLES 4 THROUGH 6 AND COMPARATIVE EXAMPLES 2 THROUGH 4

The same amorphous powder as used in Examples 1 through 3 was mixed with 2% by weight of a crystalline silicon nitride powder shown in Table 2 for 30 minutes in an attrition mill. The obtained powdery mixture was molded by a tablet machine. The molded body was placed in a high frequency induction furnace and the temperature was elevated at 20° C./min, and the molded body was maintained at 1,500° C. for 0.5 hour to obtain a silicon nitride powder. The nitrogen content, α-phase content, average particle size of the obtained powder and the density, fracture toughness, and room temperature strength of the sintered body are shown in Table 2.

TABLE 2

|  | Oxygen content of crystalline silicon nitride (wt. %) | Nitrogen content (wt. %) | α-Phase content (wt. %) | Average particle size (μm) | Density of sintered body (g/cm³) | Fracture toughness (MN/m^{3/2}) | Room temperature strength (kg/mm²) |
| --- | --- | --- | --- | --- | --- | --- | --- |
| Example 4 | 1.0 | 38.8 | 93 | 0.3 | 3.23 | 6.3 | 93 |
| Example 5 | 1.8 | 38.8 | 95 | 0.3 | 3.23 | 6.4 | 92 |
| Example 6 | 2.5 | 38.6 | 95 | 0.4 | 3.23 | 6.4 | 90 |
| Comparative Example 2 | 0.3 | 38.9 | 87 | 0.3 | 3.23 | 5.3 | 70 |
| Comparative | 0.5 | 38.8 | 88 | 0.3 | 3.23 | 5.5 | 75 |

TABLE 2-continued

|  | Oxygen content of crystalline silicon nitride (wt. %) | Nitrogen content (wt. %) | α-Phase content (wt. %) | Average particle size (μm) | Density of sintered body (g/cm³) | Fracture toughness (MN/m^{3/2}) | Room temperature strength (kg/mm²) |
| --- | --- | --- | --- | --- | --- | --- | --- |
| Example 3 Comparative Example 4 | 0.8 | 38.8 | 88 | 0.3 | 3.23 | 5.5 | 74 |

EXAMPLES 7 THROUGH 9 AND COMPARATIVE EXAMPLE 5

Silicon diimide was mixed with 2% by weight of a crystalline silicon nitride powder having an oxygen content of 1.5% by weight, an α-phase content of 86%, and an average particle size of 0.3 μm for 60 minutes by a vibrating ball mill made of nylon. The obtained powdery mixture was molded in a tablet machine and placed in a high frequency induction furnace. The temperature was elevated at a rate of 20° C./min, and the molded body was maintained at a temperature shown in Table 3 for 0.5 hour to obtain a crystalline silicon nitride powder. The nitrogen content, α-phase content, and average particle size of the formed powder, and the density, fracture toughness, and room temperature strength of the sintered body are shown in Table 3.

TABLE 3

|  | Heating temperature (°C.) | Nitrogen content (wt. %) | α-Phase content (wt. %) | Average particle size (μm) | Density of sintered body (g/cm³) | Fracture toughness (MN/m^{3/2}) | Room temperature strength (kg/mm²) |
| --- | --- | --- | --- | --- | --- | --- | --- |
| Example 7 | 1,450 | 38.9 | 95 | 0.3 | 3.23 | 6.4 | 93 |
| Example 8 | 1,500 | 38.8 | 95 | 0.3 | 3.23 | 6.5 | 92 |
| Example 9 | 1,600 | 38.7 | 93 | 0.4 | 3.22 | 6.3 | 90 |
| Comparative Example 5 | 1,350 | 38.8 | Amorphous | 0.2 | 2.80 | — | 37 |

We claim:

1. A process of preparing crystalline silicon nitride by the thermal decomposition of a nitrogen-containing silane compound, said process comprising the steps of:
   forming a powder or molded body having a powder bulk density of at least 0.1 g/cm³ expressed in terms of silicon, from a mixture of a crystalline silicon nitride powder having an oxygen content of at least 1.0% by weight and a nitrogen-containing silane compound, and
   thermally decomposing said mixture while said mixture is heated at a temperature-elevating rate of at least 15° C. per minute in a temperature range of from 1,350° C. to 1,550° C., to obtain thereby an α-type silicon nitride powder.

2. The process of preparing crystalline silicon nitride according to claim 1, wherein the oxygen content of the crystalline silicon nitride powder mixed with the nitrogen-containing silane compound is in the range of from 1.0 to 3.0% by weight.

3. The process of preparing crystalline silicon nitride according to claim 1, wherein the amount of the crystalline silicon nitride in the mixture of the crystalline silicon nitride powder and the nitrogen-containing silane compound is in the range of from 0.1 to 15% by weight.

4. The process of preparing crystalline silicon nitride according to claim 1, wherein the mixture of the crystalline silicon nitride powder and the nitrogen-containing silane compound is heated at 1,400° C. to 1,700° C. to effect thermal decomposition.

5. The process of preparing crystalline silicon nitride according to claim 1, wherein the amount of α-type silicon nitride powder obtained is at least 93% by weight.

* * * * *